United States Patent [19]

Miers et al.

[11] Patent Number: 4,615,767
[45] Date of Patent: Oct. 7, 1986

[54] PROCESS FOR REMOVING INK-BEARING FINES FROM DRY-DEINKED SECONDARY FIBER SOURCES

[75] Inventors: Robert M. Miers, Outagamie County; Byron R. Terry, Winnebago County, both of Wis.

[73] Assignee: Kimberly-Clark Corporation, Neenah, Wis.

[21] Appl. No.: 664,462

[22] Filed: Oct. 25, 1984

[51] Int. Cl.⁴ .............................................. D21B 1/08
[52] U.S. Cl. ......................................... 162/4; 162/55; 209/3; 209/23; 209/29; 241/24; 241/28
[58] Field of Search ..................... 162/4, 5, 55; 209/3, 209/23, 29; 241/24, 28

[56] References Cited

U.S. PATENT DOCUMENTS 3,966,126  6/1976  Werner ................................. 241/24
4,124,168  11/1978  Bialski et al. ......................... 241/14
4,305,507  12/1981  Wittkopf ................................. 209/3

FOREIGN PATENT DOCUMENTS 2133817  8/1984  United Kingdom .................... 162/4

Primary Examiner—S. Leon Bashore
Assistant Examiner—K. M. Hastings
Attorney, Agent, or Firm—Gregory E. Croft

[57] ABSTRACT

A method of deinking comprises: (a) mechanically fiberizing a secondary fiber source in a substantially dry state, preferably air dry, thereby producing a fibrous material consisting of substantially discrete fibers and ink-bearing fines: (b) depositing the fibrous material onto a moving screen or wire which retains fibers and allows fines to pass therethrough; and (c) lifting the fibrous material above the screen with upwardly directed forced air and redepositing the material onto the screen, whereby upon re-deposition of the material, additional fines pass through the screen.

12 Claims, 5 Drawing Figures

PROCESS FOR REMOVING INK-BEARING FINES FROM DRY-DEINKED SECONDARY FIBER SOURCES

BACKGROUND OF THE INVENTION

This application relates to copending application Ser. No. 554,174 filed Nov. 22, 1983 now abandoned, entitled "Process for Dry Deinking of Secondary Fiber Sources".

The commercial production of various types of paper requires the use of recycled paper as a source of papermaking fibers due to the expense of virgin fibers. Prior to using such secondary fiber sources for making a commercial product, it is necessary to treat the fiber source to remove unwanted chemical constituents which adversely affect the quality of the final paper product. The most notable contaminants to be removed are inks or dyes which adversely affect the color and brightness of secondary fibers used as a feedstock. Ink deposits on paper are extremely thin and roughly have a thickness of only about 0.0001 inch. Chemically, the inks are generally a mixture of pigment or organic dye, binder, and solvent. Some inks also contain metallic driers, plasticizers, and waxes to impart desired properties. Hence, their chemical make-up can be very complex. However, inks are not to be equated with other additives or contaminants such as varnishes, sizes, and plasticizers, which are chemically and physically of a different nature as those skilled in the art of deinking will appreciate.

The prior art has addressed secondary fiber clean-up generally by subjecting secondary fiber sources to a variety of treatments. The most common form of treatment is chemical wet deinking. However, wet deinking processes can be expensive and produce large quantities of sludge, which creates a disposal problem. In addition, there are certain types of papers which cannot be successfully deinked at all by conventional wet methods because they are chemically unreactive with the deinking agents.

Other treatments of secondary fibers have been directed toward separating other contaminants besides inks from the secondary fibers, such as plastic coatings and miscellaneous particulates. For example, French Pat. No. 1295608 (1961) teaches recovery of waste paper coated with synthetic materials or plastic films by wetting the waste paper and subjecting the slurry to attrition in a beating device. The hydrophobic plastic particles can be separated from the hydrophylic fibrous material, which has been disintegrated by the attrition mill into particles (fibers) which are smaller than the plastic particles. British Pat. No. 940,250 (1963) teaches a method for recovering fibrous materials from waste paper products which have been coated with synthetic resins in the form of a rigid film. The waste material is exposed to vigorous mechanical treatment in the presence of less than 70 weight percent water to fiberize the material, while leaving the synthetic resin film in relatively large pieces. British Pat. No. 1228276 (1971) teaches a method for recovering fibrous material from plastic coated or plastic-containing wastepaper. The wastepaper is fiberized in water whereby the plastic separates from the fibers in small particles. The plastic particles are then separated from the fibers. A Russian article entitled "Dry Comminution of Waste Paper:, M. V. Vanchakov, V. N. Erokhin, M. N. Anurov (Jan. 14, 1981) teaches dry grinding of wastepaper in a hammermill as a pretreatment prior to a hydropulper to separate large contaminants such as fasteners, cloth, polyethylene film, and others. The ground material was passed through separator screens having 4 mm. and 8 mm. diameter holes and the fractions passing through the screens were defiberized in a hydropulper. However, as suggested previously, none of these methods are directed to deinking. All are concerned with removal of plastic films and coatings, which separate out as relatively large pieces. Also, except for the Russian article, all of these methods use water and accordingly are not suggestive of a dry process. On the other hand, the Russian article does not suggest deinking, but rather is directed toward removal of large contaminants rather than fines.

Still other prior methods of treating waste papers use different approaches. For example, U.S. Pat. No. 3,736,221 (1973) to Evers et al teaches a method for making shaped bodies from wastepaper by fiberizing the wastepaper in a hammermill, coating the fibers with an aqueous binder, compressed under pressure, and baked. No effort is made to remove the ink from the wastepaper. U.S. Pat. No. 4,124,168 (1978) to Bialski et al teaches a method for recovering different types of wastepaper from a mixed source by fragmenting the source materials and separating the various components by their fragmentability. This method only serves to classify various types of wastepaper present in a mixed sample and does not attempt to remove the ink from the wastepaper. German Pat. No. 1097802 (1961) teaches a method for reclaiming wastepaper by tearing the paper and cleaning it, crimping and rolling the torn paper in a practically dry state, and defibering in the dry state, optionally in the presence of dry steam. This method seeks to overcome difficulties in fiberizing wastepapers coated with hydrophobic materials which do not respond well to aqueous methods. There is no teaching, however, that inks can be removed by such a dry treatment.

The previously mentioned copending application Ser. No. 554,174 also published in Belgian Pat. No. 898,500, issued Jan. 16, 1984, describes an invention which has overcome the disadvantages of the abovesaid prior deinking methods. The process involves fiberizing an ink-containing secondary fiber source, substantially dry, wherein individual fibers and ink-containing fines are produced. The fibers and fines are then separated by any suitable means, such as by depositing the material on a moving wire and drawing the fines down through the wire with a vacuum on the underside of the wire. However, it has been found that the initial deposition of the fibrous material onto the screen may not necessarily remove all of the fines present in the fibrous material, particularly if the resulting layer of fibers is too thick. Therefore, improvements to the separation step can be useful.

SUMMARY OF THE INVENTION

In general, the invention resides in a method for deinking a secondary fiber source comprising: (a) mechanically fiberizing the secondary fiber source in a substantially dry state, preferably air dry, thereby producing a fibrous material consisting of substantially discrete fibers and ink-bearing fines; (b) depositing the fibrous material onto a moving screen or wire which retains fibers and allows fines to pass therethrough; and (c) lifting the fibrous material above the screen with upwardly directed air and redepositing the material onto the screen, whereby upon re-deposition of the material, additional fines pass through the screen. It has been observed that repeating step (c) above can increase the amount of fines removed. The fines being removed can be in the form of ink particles, fiber fragments bearing ink, or other particulate matter bearing ink, such as fillers and paper size fragments, fiber fragments formed during the fiberization, fiber fragments initially present in the secondary fiber source, and particulate filler materials initially present in the secondary fiber source.

For purposes herein, "secondary fiber source" means cellulosic products bearing or containing ink, such as printed waste paper, reclaimed for use as a source of papermaking fibers.

"Air dry" means the moisture content of the secondary fiber source is in equilibrium with the atmospheric conditions to which it is exposed.

"Substantially discrete fibers" means essentially individual fibers, with allowance for some fiber aggregates, which are many times longer than their diameter.

"Substantially dry state" means that there is insufficient free water or moisture present on or within the fibers or fines to cause the fibers and fines to substantially adhere to each other. Typical secondary fiber sources may contain from about three to nine weight percent moisture and, for purposes of this invention, it is preferred that no additional water be present or added to the secondary fiber source to be fiberized. It has been found that as the water content of the paper increases, the energy requirements of the fiberization apparatus increases rapidly. This energy increase tends to destroy the fibers resulting in unacceptable fiber degradation. Also, as the water content within the fiberizer increases, the fibers and fines within the fiberizer will adhere to each other and plug up the apparatus. Hence, "substantially dry state" may include the presence or addition of water, but not so much as to cause an unacceptable or uneconomical amount of fiber degradation or energy consumption or plugging of the fiberizer. A specific numerical limitation for the water content will depend on the characteristics of the specific secondary fiber source and the operation and economics of the specific fiberization apparatus, which can differ greatly. These limitations can be determined without undue experimentation by those skilled in the art. In general, however, a total moisture content of about 20 weight percent based on solids is believed to be the upper practical limit for most situations.

The process of this invention is particularly useful for removing inks from secondary fiber sources which have been treated or coated with a surface size or a barrier material. The size serves as a holdout to the ink in such a manner as to prevent the ink from directly contacting the surface of the fibers upon application of the ink to the secondary fiber source. In such cases, at least some of the size or coating is removed with the ink fines during fiberization. Examples of barrier coatings or surface sizes include starches, casein, animal glue, carboxymethyl cellulose, polyvinyl alcohol, methyl cellulose, wax emulsions, and a variety of resin polymers.

The discrete fibers obtained by the process of this invention, which do not exhibit hydration (which is characteristic of fibers obtained by wet deinking methods), are suitable as secondary fiber and can be recycled for the manufacture of cellulosic products such as tissue, papers, pads, diapers, or other products made from fibrous webs or batts.

DETAILED DESCRIPTION OF THE DRAWING

Figure 1:
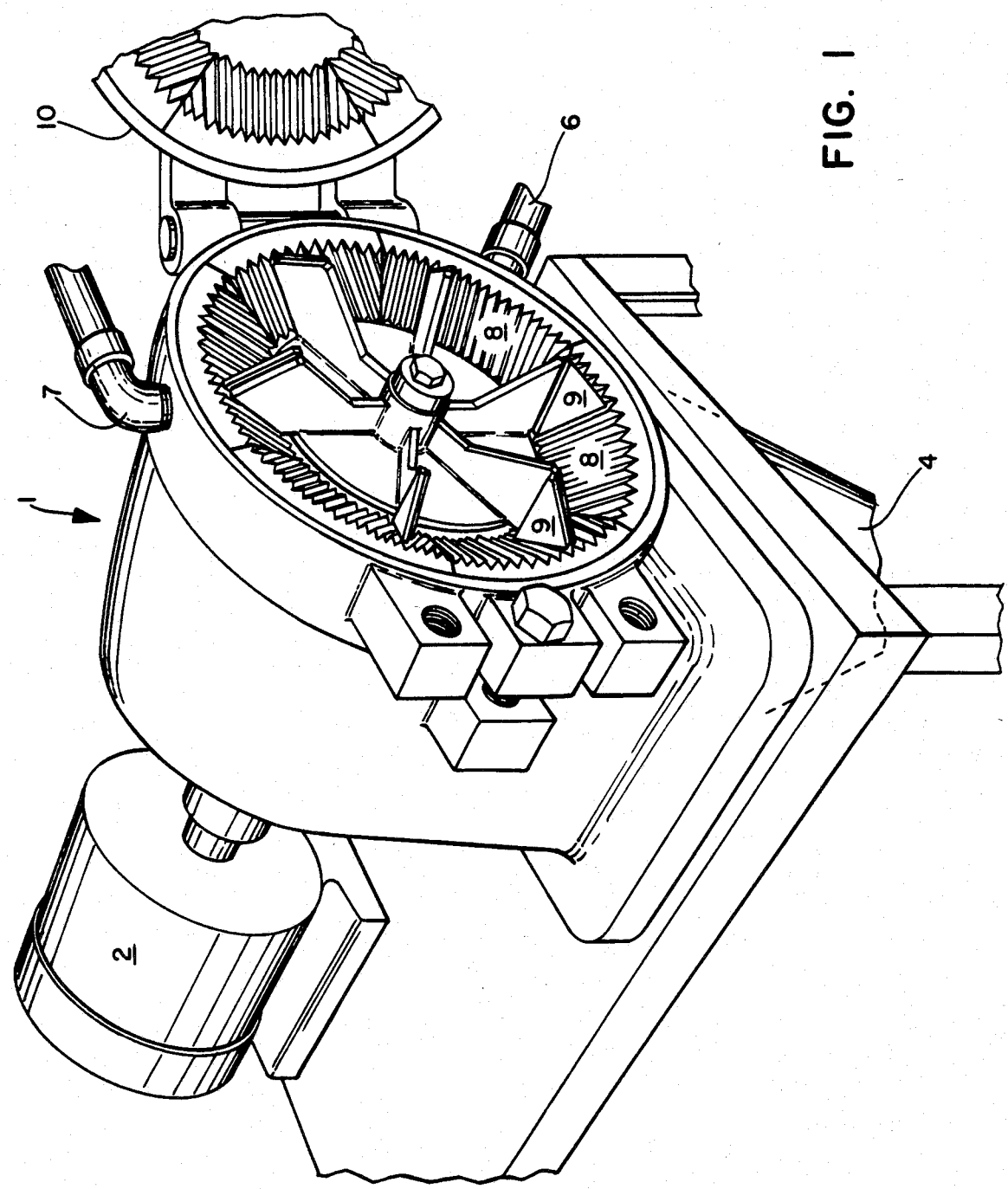
FIG. 1 is a perspective view of a suitable fiberizer for use in the process of this invention shown with the front lid opened to expose the impeller blades and the serrated working surface.

FIG. 1 illustrates the internal working chamber of a suitable fiberizer 1 for forming the fibrous material from the secondary film source. The specific apparatus illustrated and used for purposes herein was a Pallman Ref. 4 fiberizer and is illustrated in U.S. Pat. No. 3,069,103. Shown is the serrated, grooved working surface 8 against which the feed material is abraded by the action of the moving rotor blades 9 driven by a suitable drive means 2. Cooling water is provided to the fiberizer through inlet 6 and outlet 7. The working surface 8 is also present on the hinged cover 10, shown in the open position. Although not clearly shown in this Figure, there is a space between the serrated working surface and the blades in which cellulosic materials are buffeted about. The blade position relative to the working surface 8 is adjustable to add a degree of control over the extent of fiberization, which is also controlled by the rotor speed, the residence time, and nature of the working surface. The working surface 8 consists of six removable segments. These can be replaced by a greater or fewer number of segments having a different design or configuration with respect to the surface. This flexibility provides an infinite number of choices for altering and optimizing the fiberization. However, the configuration illustrated herein has worked very satisfactorily. More specifically, the grooves of each segment as shown are parallel to each other and are spaced apart by about 2 millimeters (mm.), measured peak-to-peak. Each groove is about 1.5 mm. deep. The radial width of each segment is about 10 centimeters (cm.). These dimensions are given only for purposes of illustration and are not limiting, however. Also partially shown is the working surface on the inside of the hinged cover 10, which is substantially identical to the other working surface 8 already described. When the cover is closed, the two working surfaces provide an inner chamber in which the feed material is fiberized.

Figure 2:
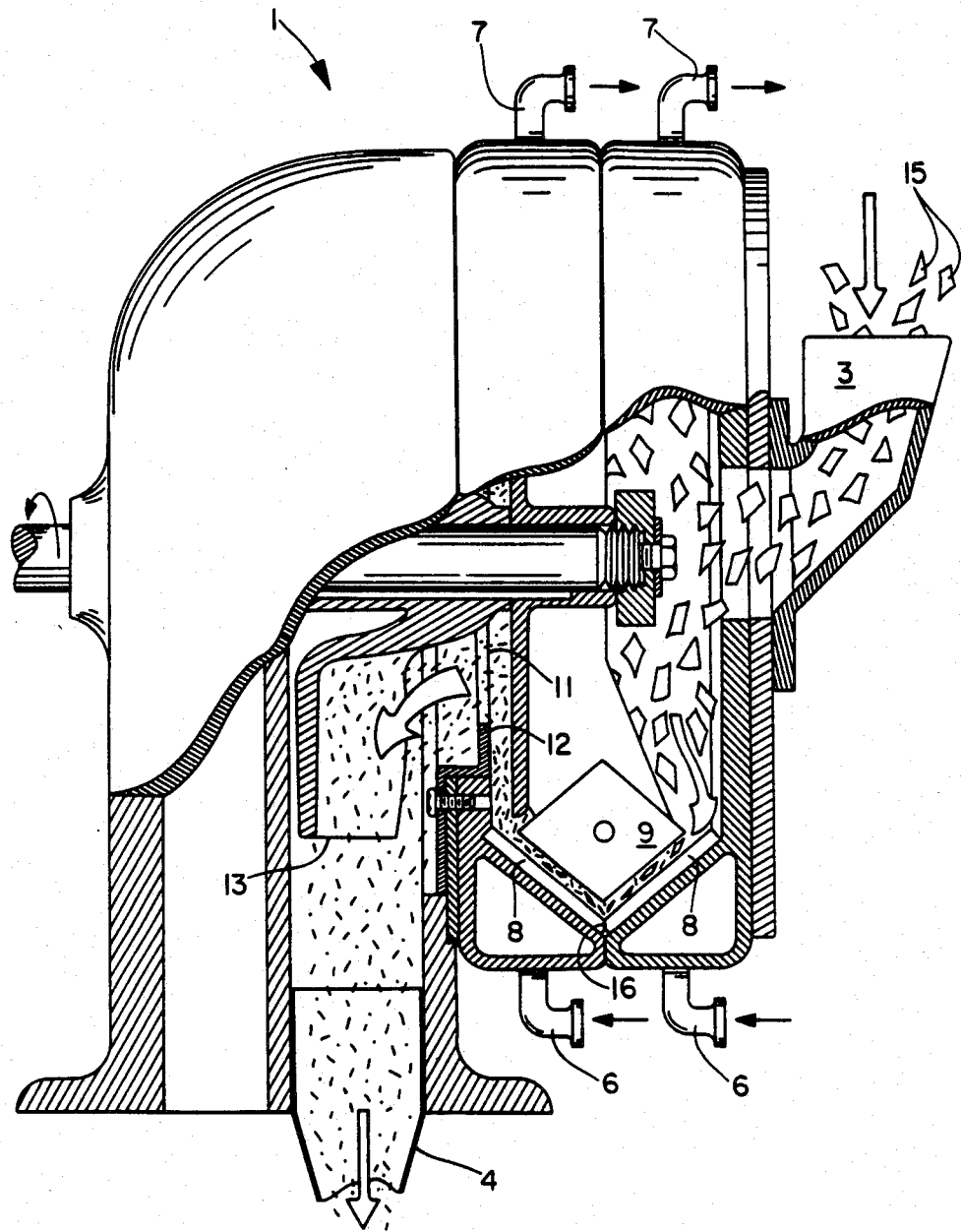
FIG. 2 is a side elevation of the same fiberizer partially in section illustrating its operation.

FIG. 2 is a cross-sectional, cut-away view of the fiberizer schematically illustrating its operation. The arrows indicate the direction of flow of air and fibers. More specifically, secondary fiber source 15 is introduced into the feed inlet 3 where it is contacted by the rotating blades 9. The air flow directs the secondary fiber source between the rotor blades and the working surface 8 such that the secondary fiber source is comminuted into smaller and smaller particles, eventually being reduced to substantially discrete fibers and fines. The centrifugal forces created by the rotor blades tend to force the particles, preferentially the larger particles, to the apex 16 between the angled working surfaces.

These forces tend to keep the larger particles from escaping before they have been completely fiberized. Upon substantially complete fiberization, the comminuted solid materials are carried through the orifice 11 of the removable plate 12. The fan impellers 13 then force the airborne fibers out through the exit port 4.

Figure 3:
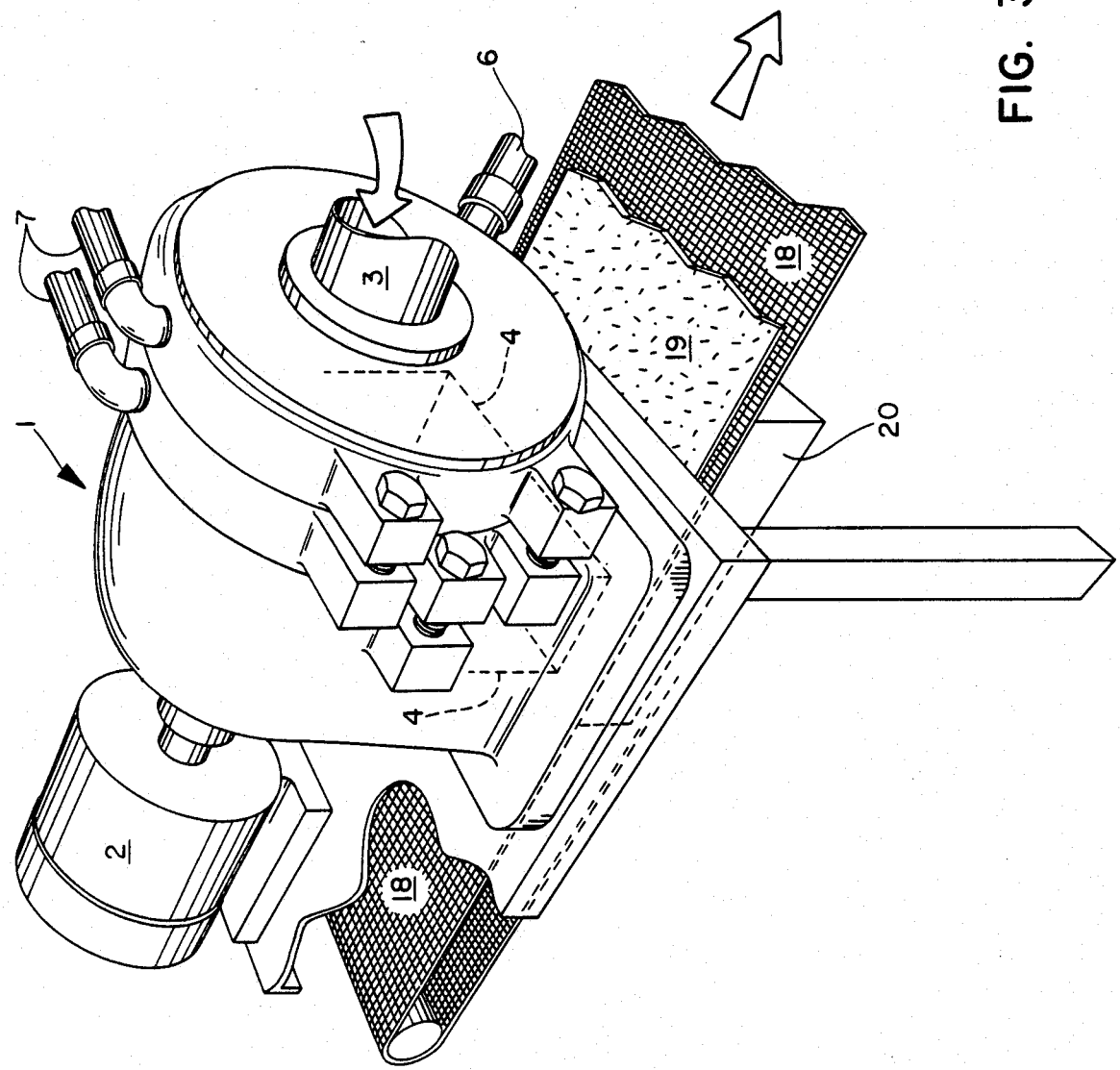
FIG. 3 is a perspective view of the same fiberizer operating in a continuous mode.

FIG. 3 illustrates the fiberizer previously described in continuous operation as would likely be required for commercial operation. In this embodiment, the feed inlet 3 is shown as a tubular inlet which will provide a continuous supply of shredded secondary fiber sources material of suitable size and quality. Generally speaking, such a material can be in the form of sheets of from about 2 to about 4 inches square or less and should be free of debris to protect the fiberization apparatus. However, the particle size and shape of the feed will depend on the capabilities of the particular fiberizer being used and is not a limitation of this invention. Rip shears can be and were used, for example, for shredding the secondary fiber sources. Also illustrated is the continuously moving screen 18 which collects the fibers in the form of a web or batt 19. The mesh of the screen is selected to allow the fines to pass through, preferably aided by a vacuum box 20 which collects fines and channels them to an appropriate recovery site. A wire cloth from W. S. Tyler Incorporated having a mesh of 150 (150 openings per linear inch), a wire diameter of 0.0026 inch, an opening width of 0.0041 inch, and an open area of 37.4% has been found to work best when producing a web having a basis weight of about 12 lb./2880 square feet or less. Thicker webs tend to trap the fines within the web itself regardless of the size of the wire openings. Shown in phantom lines is a modified exit port 4 which has been widened to accommodate the width of the moving screen. In actual practice on a continuous basis, for example, shredded wastepaper was fed to the Pallman fiberizer at a rate of 1.5 pounds per minute. The fiberizer was set up with a 3 mm. clearance between the serrated working surface and the rotor blades. A removable plate having an orifice of 140 mm. was installed behind the impeller, which travelled at 4830 rounds per minute (r.p.m.) with no load. Air flow through the fiberizer was about 365 cubic feet per minute. Cooling water was fed to the cooling jacket at the rate of 2 liters per minute. Initial water temperature measured 59-60 degrees Fahrenheit (°F.) and levelled off at 66°-68° F. after an extended run. The wire had a mesh size of 150 mesh, which was large enough to permit the fines to pass through yet small enough to retain the fibers. The speed of the wire receiving the fiberized material from the fiberizer was set at 350 feet per minute. Vacuum under the wire measured 0.6 inch of water. About 18.85% of the secondary fiber source passed through the wire as fines, whereas the remainder was collected on the wire as a dry deinked product. The fines portion contained about 75 weight percent fiber particulates and about 25 weight percent clay (filler). Both portions contained ink.

Figure 4:
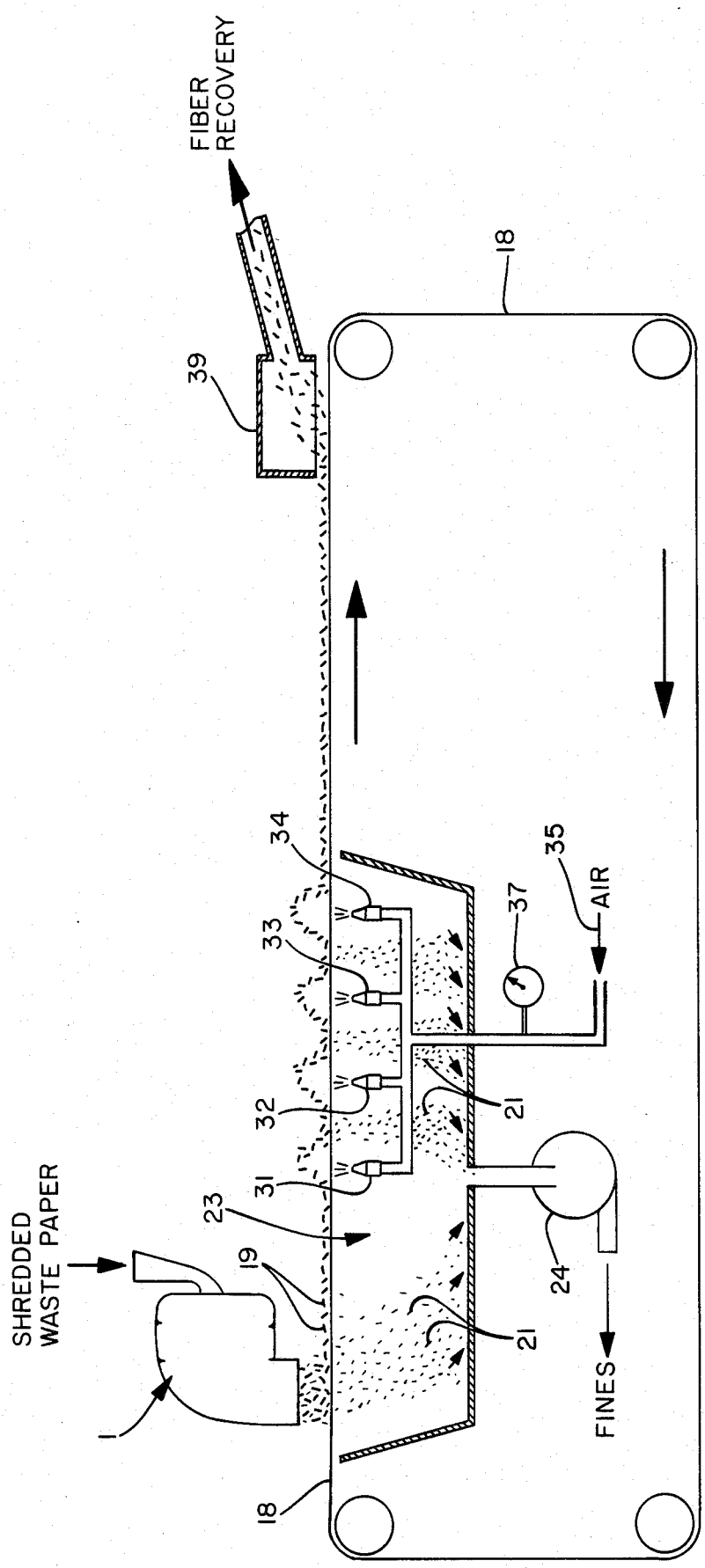
FIG. 4 is a schematic flow diagram illustrating the process in accordance with this invention using air showers to lift the fibrous material above the screen.

FIG. 4 schematically illustrates one embodiment of the process of this invention. Shown is the fiberizer 1 receiving suitably sized shredded ink-containing wastepaper which is fiberized into a fibrous material 19 as previously described and deposited onto a moving screen or wire 18. The fines 21 filter through the screen into a vacuum chamber 23 wherein a vacuum is maintained on the underside of the screen in a suitably enclosed space by a vacuum pump 24 and suitably-spaced orifices and piping to provide sufficient vacuum throughout the vacuum chamber to hold the fibrous material onto the screen.

After the initial deposition of the fibrous material onto the moving screen, the fibrous material is then acted upon by a series of air showers 31, 32, 33, and 34. Each of the air showers consists of a tube positioned with its length in the cross-machine direction of the travelling screen and suitably connected to a source of pressurized air 35. The air pressure can be measured with a pressure gage 37. Each air shower tube contains a multiplicity of spaced apart orifices positioned below the screen such that forced air is directed upwardly through the screen in a manner to momentarily lift the fibrous material above the screen as illustrated. The force of the air must be such that the vacuum present below the fabric is able to prevent the raised fibers from being blown away and thereby pulling the raised fibers back down onto the screen as shown. As a result, some fines 21 previously present in the fibrous material 19 pass through the screen and are removed from the system via the vacuum pump. This process can be repeated as many times as necessary to sufficiently remove the fines. In fact, a distinct advantage of this method is the flexibility available to process operators to adjust the air flow as needed for any given situation. By providing a multiplicity of air showers, the capability to obtain the highest degree of fines removal is available as desired.

In actual practice, it is important to keep the thickness of the fibrous layer on top of the screen as thin as possible or otherwise the fibers act as a filter and prevent the fines from reaching the screen. As an example, at a moving screen speed of about 650 feet per minute and a fibrous material deposition rate of about 2 pounds per minute, the height or thickness of the fibrous material on top of the screen was about 1/16 inch. A vacuum of about 3 inches of water was maintained on the underside of the screen, which consisted of 150 mesh stainless steel screen as previously described about 6 inches wide. An air pressure of about 15 psi was maintained at the pressure gauge 37. The air shower tubes were 1¼ inch O.D. copper tubing and extended the full width of the screen. The first air shower 31 had a series of orifices of 0.05 inch in diameter spaced apart 0.1 inch, center-to-center. The second air shower 32 had 0.037 inch diameter orifices spaced apart 0.1 inch, center-to-center. The third and fourth air showers 33 and 34 had 0.037 inch diameter orifices spaced apart 0.75 inch, center-to-center. Under these conditions, the fibrous material laying on top of the moving screen was lifted above the screen about 1 inch by each of the air showers, which were spaced apart by about 4 inches. This spacing permitted the vacuum chamber to pull the fibers back down onto the screen in between air showers as illustrated and thereby remove fines at the same time. By operating in this manner, additional fines can be removed from the fibrous material initially deposited on the screen. When the desired amount of fines has been removed, the fibers remaining on the travelling screen are suitably removed, as by a suction box 39 as shown and directed to fiber recovery.

Figure 5:
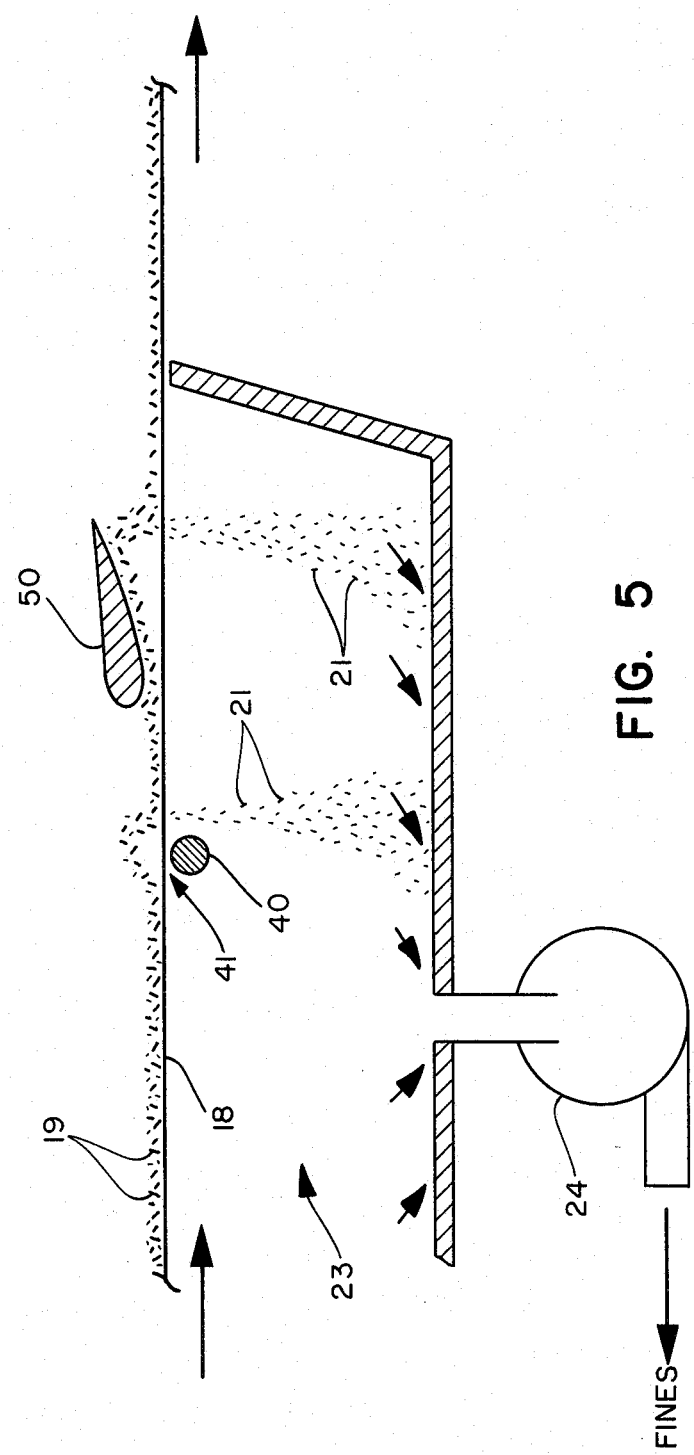
FIG. 5 is a schematic flow diagram of the process of FIG. 4, except the air showers are replaced by alternative means.

FIG. 5 illustrates two alternative means for providing upwardly directed air to lift the fibrous material above the screen, each of which means can be used alone or in combination with each other or in combination with the air shower. More specifically, the two alternative means are a sub-screen surface, represented by a cylindrical rod 40, or an above-screen surface, represented by a foil 50. The operating principle behind the function of these alternative means is that the speed of the travelling screen causes a stream of air to be carried with the screen. When this airstream contacts a solid surface, it is diverted one way or the other. Depending on the shape of the surface, the airstream can be directed upwardly and thereby lift or pull the fibrous material above the screen as shown.

In the case of the rod 40, the airstream moving with the underside of the travelling screen 18 becomes compressed as it enters the tapering "pocket" 41 formed between the screen 18 and the leading surface of the rod 40. This causes air to be forced upwardly through the screen and lift the fibers above the screen as shown. More than one rod can be positioned in series to repeat the process as necessary. The shape of the tapering pocket can influence its effectiveness. It is believed that too small of a pocket, as created by a rod with too small of a diameter, will not trap enough air to cause a sufficient pressure build-up to lift the fibers. A cylindrical rod having a diameter of 1¼ inch positioned in contact with the underside of the travelling screen has been found to work well, but other sizes and shapes can be successfully used with minimal experimentation. An advantage of this embodiment is its mechanical simplicity in that a source of compressed air and air nozzles are unnecessary. On the other hand, adjustment of the upward air flow is not as easily made, although some adjustment can be made by changing the position of the rod.

In the embodiment wherein a foil 50 is used, the airstream moving with the upper surface of the travelling screen creates a zone of lower pressure beneath the trailing edge of the foil, known as the Bernoulli effect, thereby causing an upward flow of air which raises the fibers above the screen as shown. As with the previous embodiment, the design of the foil must be optimized to meet the needs of the particular situation. One or more foils can be used in series, or the foil(s) can be used in combination with sub-screen surface or the air shower.

It will be appreciated that the specific shapes of the above-screen surface and the sub-screen surface can be optimized according to aerodynamic principles.

We claim:
1. A method for deinking a secondary fiber source comprising:
   (a) mechanically fiberizing the secondary fiber source in a substantially dry state, thereby producing a fibrous material comprising substantially discrete fibers and ink-bearing fines;
   (b) depositing the fibrous material in a thin layer onto a moving screen under which a vacuum is maintained, wherein said moving screen retains the fibers and allows the ink-bearing fines to pass therethrough; and
   (c) momentarily lifting the thin layer of fibrous material above the screen with upwardly directed air and redepositing the thin layer of fibrous material onto the screen, whereby upon re-deposition of the thin layer of fibrous material additional ink-bearing fines pass through the screen.

2. The method of claim 1 wherein the fibrous material is lifted above the screen and redeposited onto the screen two or more times.

3. The method of claim 1 wherein the fibrous material is lifted above the screen by one or more air showers, said air showers being spaced apart in the machine direction a distance sufficient to allow the fibrous material to return to the screen between air showers.

4. The method of claim 1 wherein the fibrous material is lifted above the screen by upwardly flowing air caused by the interaction between a solid surface positioned below the moving screen and an air current generated by the underside of the moving screen.

5. The method of claim 4 wherein the solid surface is the surface of a cylindrical rod.

6. The method of claim 1 wherein the fibrous material is lifted above the screen by upwardly flowing air caused by the interaction between a solid surface positioned above the moving screen and an air current generated by the upper surface of the screen.

7. The method of claim 6 wherein the solid surface is a foil.

8. The method of claim 4 wherein the solid surface defines a tapering pocket between the solid surface and the moving screen, said tapering pocket shaped to compress air moving with the moving screen, thereby forcing air upwardly through the screen.

9. The method of claim 8 wherein the solid surface is mounted fixedly in place below the screen.

10. The method of claim 6 wherein the solid surface is shaped to interact with air moving with the screen to create a zone of low pressure between the solid surface and the screen, thereby drawing air upwardly through the screen.

11. The method of claim 10 wherein the solid surface is mounted fixedly in place above the screen.

12. The method of claim 1 wherein the screen moves in a selected direction, wherein the fibrous material is lifted in step (c) at a first zone, wherein the fibrous material is redeposited in step (c) at a second zone, and wherein the screen moves in the selected direction from the first zone to the second zone.

* * * * *